US012312855B2

(12) United States Patent
Schmidt et al.

(10) Patent No.: US 12,312,855 B2
(45) Date of Patent: May 27, 2025

(54) RADAR SENSOR SYSTEM AND METHOD FOR CONTACTLESSLY MOVING A VEHICLE DOOR RELATIVE TO A VEHICLE BODY

(71) Applicant: Brose Fahrzeugteile SE & Co. Kommanditgesellschaft, Bamberg, Bamberg (DE)

(72) Inventors: Christian Schmidt, Bamberg (DE); Bernd Herthan, Michelau (DE); Carsten Topf, Schonungen (DE)

(73) Assignee: Brose Fahrzeugteile SE & Co. Kommanditgesellschaft, Bamberg (DE)

( * ) Notice: Subject to any disclaimer, the term of this patent is extended or adjusted under 35 U.S.C. 154(b) by 98 days.

(21) Appl. No.: 17/762,558

(22) PCT Filed: Sep. 22, 2020

(86) PCT No.: PCT/EP2020/076354
§ 371 (c)(1),
(2) Date: Mar. 22, 2022

(87) PCT Pub. No.: WO2021/058449
PCT Pub. Date: Apr. 1, 2021

(65) Prior Publication Data
US 2023/0018226 A1  Jan. 19, 2023

(30) Foreign Application Priority Data
Sep. 23, 2019 (DE) .................... 10 2019 214 496.9

(51) Int. Cl.
*E05F 15/73* (2015.01)
*E05F 15/60* (2015.01)
*G01S 13/88* (2006.01)

(52) U.S. Cl.
CPC .............. *E05F 15/73* (2015.01); *E05F 15/60* (2015.01); *G01S 13/88* (2013.01);
(Continued)

(58) Field of Classification Search
CPC ...... E05F 15/73; E05F 15/43; E05Y 2400/44; E05Y 2400/852; E05Y 2900/546; G01S 13/88; G01S 7/415; G01S 2013/93272
See application file for complete search history.

(56) References Cited

U.S. PATENT DOCUMENTS 9,689,982 B2 * 6/2017 Herthan .............. G01S 13/0209
2001/0042989 A1 * 11/2001 Greif ....................... E05F 15/40
296/50

(Continued)

FOREIGN PATENT DOCUMENTS

DE   102007041288 A1   3/2009
DE   102013010993 A1   1/2015
(Continued)

OTHER PUBLICATIONS

Notification of Reason for Refusal for JP Application No. 2022-518320, Dated May 21, 2024, Google Machine Translation attached to original, All together 12 Pages.
(Continued)

*Primary Examiner* — Justin B Rephann
(74) *Attorney, Agent, or Firm* — Dickinson Wright PLLC

(57) ABSTRACT

A system for providing contactless movement of a vehicle door relative to a vehicle body including an electric-motor movement device for moving the vehicle door, a radar sensor system for detecting, in the region of the vehicle door, a gesture to be performed by a user, and a control device for controlling the movement device according to a detection by the radar sensor system. The radar sensor system is configured to detect, in a first operating mode, a movement in a
(Continued)

detection region in an environment of the vehicle door and to detect, in a second operating mode, a gesture for moving the vehicle door, the radar sensor system being configured to switch to the second operating mode when a movement is detected in the first operating mode.

21 Claims, 2 Drawing Sheets

(52) U.S. Cl.
CPC ....... *E05Y 2400/44* (2013.01); *E05Y 2400/45* (2013.01); *E05Y 2400/858* (2013.01); *E05Y 2900/546* (2013.01)

(56) References Cited

U.S. PATENT DOCUMENTS

| | | | | |
|---|---|---|---|---|
| 2007/0205863 A1* | 9/2007 | Eberhard | ................ | E05F 15/76 340/5.72 |
| 2011/0276234 A1* | 11/2011 | Van Gastel | ............ | E05F 15/73 701/49 |
| 2013/0055639 A1* | 3/2013 | Brosseit | .................. | B60J 5/101 49/31 |
| 2015/0009062 A1* | 1/2015 | Herthan | ................. | G01S 7/415 342/70 |
| 2015/0025751 A1* | 1/2015 | Sugiura | ................... | B60J 5/101 701/49 |
| 2018/0170309 A1* | 6/2018 | McMahon | .............. | G01S 13/88 |
| 2018/0329049 A1* | 11/2018 | Amihood | ................ | G01S 13/04 |
| 2018/0329050 A1* | 11/2018 | Amihood | ............. | G01S 7/4008 |
| 2019/0128040 A1* | 5/2019 | Mitchell | ................ | E05F 15/40 |
| 2019/0277962 A1 | 9/2019 | Ingram et al. | | |
| 2022/0316261 A1* | 10/2022 | Salter | ...................... | E05F 15/76 |
| 2023/0323723 A1* | 10/2023 | Guevara Rosas | ....... | E05F 15/73 49/31 |

FOREIGN PATENT DOCUMENTS

| | | |
|---|---|---|
| DE | 102017202016 A1 | 8/2018 |
| DE | 102018127038 A1 | 5/2019 |
| DE | 102019102443 A1 | 8/2019 |
| EP | 3099541 A1 | 12/2016 |
| EP | 3141433 A2 | 3/2017 |
| JP | H09301017 A | 11/1997 |
| JP | 2008157794 A | 7/2008 |
| JP | 2010249712 A | 11/2010 |
| JP | 2011137589 A | 7/2011 |
| JP | 2017198503 A | 11/2017 |
| JP | 2018084122 A | 5/2018 |

OTHER PUBLICATIONS

Japanese Office Action for Application No. 2022-518320, dated Nov. 26, 2024, English Translation attached to original, All together 7 Pages.

* cited by examiner

RADAR SENSOR SYSTEM AND METHOD FOR CONTACTLESSLY MOVING A VEHICLE DOOR RELATIVE TO A VEHICLE BODY

CROSS-REFERENCE TO RELATED APPLICATIONS

This application is the U.S. National Phase of PCT Application No. PCT/EP2020/076354 filed on Sep. 22, 2020, which claims priority to German Patent Application No. DE 10 2019 214 496.9, filed on Sep. 23, 2019, the disclosures of which are hereby incorporated in their entirety by reference herein.

TECHNICAL FIELD

The invention relates to a system and method for contactless movement of a vehicle door relative to a vehicle body.

BACKGROUND

Vehicles may include one or more devices or systems configured to move a vehicle door. As an example, the system may include a movement device for moving the vehicle door, a radar sensor system for detecting a gesture to be performed by a user in the area of the vehicle door and a control device for controlling the movement device depending on a detection by the radar sensor system.

The vehicle door may, for example, be a tailgate or a vehicle side door of a vehicle. It is intended to be detected here by the radar sensor system that a user is located in the area of the vehicle door, and the user has to perform a predetermined gesture, for example a kicking gesture with the foot, in order to move the vehicle door, for example to open a tailgate, and the gesture is detected accordingly by the radar sensor system and is interpreted as a movement command.

SUMMARY

One or more objects of the present disclosure may be to provide a system and method for contactless movement of a vehicle door relative to a vehicle body, and, if necessary, the system and method can also get by without a detection of a radio key or other communication device of a user.

The radar sensor system is designed accordingly to detect a movement in a detection area in a surrounding area of the vehicle door in a first operating mode and to detect a gesture for moving the vehicle door in a second operating mode, and the radar sensor system is designed to switch to the second operating mode if it detects a movement in the first operating mode.

The radar sensor system accordingly has two operating modes. In a first operating mode, (only) a detection of a movement in the vicinity of the vehicle door is performed. The first operating mode serves to activate the second operating mode by switching to the second operating mode depending on a detection in the first operating mode. Conversely, a gesture detection is performed in the second operating mode so that a movement of the vehicle door is performed only in the second operating mode by controlling the movement device for the electromotive movement.

The first operating mode can have a reduced energy consumption. The first operating mode can therefore be a low-energy mode which uses an energy supply of the vehicle in a reduced manner only.

The underlying reason for this is that a gesture detection requires, for example, a high-resolution detection and localization of an object in the area of the vehicle door. In the second operating mode, the radar sensor system has a substantial energy requirement for detecting a gesture, as a result of which the radar sensor system cannot be operated permanently in the second operating mode without imposing a substantial load on the energy supply of the vehicle, such as a vehicle battery. For this reason, the radar sensor system here has a first operating mode which has a reduced energy consumption so that an operation of the radar sensor system in the first operating mode over a lengthy periods results in only a reduced use of the energy supply for the vehicle.

In the first operating mode, it is detected whether an object, such as a user, is approaching the vehicle door. If this is established, the radar sensor system switches from the first operating mode to the second operating mode in order to detect, in the second operating mode, a gesture performed, where appropriate, by a user and accordingly initiate a control of the movement device for the electromotive movement of the vehicle door.

A contactless movement of the vehicle door, for example a tailgate or a vehicle side door or other flap device on a vehicle, is enabled in this way without a radio key or other wireless communication device such as a cell phone or the like necessarily being present.

In this way, it is enabled, for example, that a user approaches a tailgate (in the case of an unlocked vehicle or other authentication) and opens the tailgate contactlessly via the radar sensor system in that the radar sensor system initially detects an approach of the user to the tailgate in the first operating mode, then switches to the second operating mode and, when a predefined gesture, for example a kicking gesture, is performed in the area of the tailgate, initiates a movement of the tailgate, for example to open it.

By such an operation of the radar sensor system, a phase of a gesture detection and therefore a high energy consumption can be kept short by switching to the second operating mode only if an approach of a user is detected and a gesture to move the vehicle door is accordingly to be expected.

In one embodiment, the radar sensor system can be configured to measure a speed of an object in the detection area in the first operating mode. A speed measurement of this type can be performed, for example, via a Doppler frequency measurement in that the radar sensor system evaluates a Doppler frequency of a reflected receive signal and from it infers a speed of an object in the detection area.

The radar sensor system can be configured to transmit a transmit signal in the first operating mode with a reduced frequency bandwidth compared with the second operating mode. The radar sensor system can operate, for example, in a frequency range around 24 GHz or between 78-81 GHz. Whereas a total available bandwidth is utilized in the second operating mode in order to emit, for example, modulated transmit signals in pulse form or as continuous signals, only a part of the available bandwidth, for example, is used in the first operating mode in order to enable an energy-efficient transmission of signals and an energy-efficient signal processing for evaluating received signals.

The radar sensor system can be configured, for example, to operate in the first operating mode as a continuous-wave radar in that the radar sensor system emits a continuous transmit signal at a predetermined transmit frequency. A continuous-wave (CW) radar is designed to emit a transmit signal in the form of an electromagnetic wave at a defined transmit frequency, and the radar sensor system has a directional pattern defined, for example, by an antenna, for example a patch antenna, of the radar sensor system and thus emits the continuous transmit signal in a predetermined spatial direction or into a predetermined spatial area. In a CW radar, the transmit signal can, for example, be unmodulated, and a speed of a moving object can be determined, particularly in an approach direction (radially in relation to the radar sensor system), on the basis of a received reflection signal through evaluation of a Doppler frequency.

Additionally or alternatively, an energy consumption can be reduced in the first operating mode in that the radar sensor system performs, for example, a reduced number of measurements per time unit in the first operating mode compared with the second operating mode. Then again, additionally or alternatively, a spatial resolution can be reduced in the first operating mode compared with the second operating mode. The transmit power can be reduced and the signal processing can furthermore be simplified through a reduced number of measurements and furthermore through a reduced resolution, so that the first operating mode has a reduced energy consumption.

The number of measurements per time unit in the first operating mode can be permanently set. However, it is also conceivable and possible to set the number of measurements in the first operating mode adaptively, for example on the basis of information which is obtained via a higher-level control system. An adaptation of the measurement frequency can be performed, for example, time-dependently or depending on an operational state of the vehicle. The number of measurements can thus, for example, be reduced at night compared with a daytime operation. Furthermore, when the engine is running but the vehicle is stationary, the measurement frequency can be increased compared with a vehicle idle state (when the engine is switched off).

In one embodiment, the radar sensor system is designed to detect, in the first operating mode, a movement which indicates an approach of a user to the vehicle door if a speed of an object lies above a speed threshold and/or a signal strength of a reflected signal lies above a signal strength threshold. The radar sensor system thus identifies a movement as an approach of a user only if it differs sufficiently from normal signals, such as background signals and noise signals, and also lies above a threshold. An approach of a user is inferred, for example, only if the user approaches the vehicle door at a sufficiently high speed, which can be detected, for example, via a Doppler frequency in a reflection signal. Additionally or alternatively, an approach of a user is inferred, for example, only if a reception of the reflection signal is sufficiently strong, so that a reflection signal with sufficient signal strength is received.

In one embodiment, the radar sensor system is designed to detect a movement which indicates an approach of a user to the vehicle door in the first operating mode only if the speed of the object lies above the speed threshold, but below an upper speed limit, and/or if the signal strength of the reflected signal lies above the signal strength threshold, but below an upper signal strength limit.

An approach of a user is accordingly intended to be detected only if the speed of an object and/or the signal strength of a reflected signal lie(s) above a lower threshold, but below an upper limit. The radar sensor system thus identifies, for example, only a movement in which an object moves at a speed above the speed threshold, but below the upper speed limit, as an approach of a user. An approach of a user is detected only if the speed of the detected object lies within the range defined by the lower speed threshold and the upper speed limit. A movement detection, for example, due to a passing vehicle can be suppressed in this way.

A switchover from the first operating mode to the second operating mode is thus performed only if an approach of a user is detected on the basis of a moving object with a speed of movement within the range defined by the lower speed threshold and the upper speed limit or with a received signal strength of a reflected signal within the range defined by the lower signal strength threshold and the upper signal strength limit. If an object moves, for example, too quickly, no switchover from the first operating mode to the second operating mode and therefore no gesture detection are intended to be performed.

In one embodiment, the radar sensor system is designed to evaluate a direction of a movement of an object or location information for a moving object in the first operating mode and/or in the second operating mode.

The direction in which an object approaches the vehicle, for example, can be evaluated in the first operating mode. An approach angle, for example, at which an object approaches the vehicle can be evaluated. A switch from the first operating mode to the second operating mode is performed, for example, only if an object approaches the vehicle within a defined angle range.

An approach angle can be determined in the horizontal plane (azimuth). However, an approach angle can also be determined in the vertical plane (elevation). The approach of a user can be inferred, for example, if a movement of an object is detected at or above a specific height, i.e. the object is greater than a predetermined height. For this purpose, it can be assessed whether an approach therefore takes place at an elevation angle which is greater than a lower limit angle. A triggering by animals, for example, can be avoided in this way.

Location information or direction information can also be evaluated in the second operating mode in order to perform a gesture detection, for example, in a predetermined, limited area only. A gesture detection can be performed, for example, only within a range within which a foot normally moves. A triggering by an arm movement, for example, can be excluded in this case.

Furthermore, the approach angle, for example an azimuth angle and/or an elevation angle, can be evaluated in the second operating mode also. Direction information of this type can also be taken into account in the detection of a gesture so that, for example, only a gesture which is performed in a specific direction in relation to the vehicle is detected as a permitted, triggering gesture.

Direction information can be obtained in the radar sensor system, for example, via an angle measurement using the single-pulse method. For this purpose, the radar sensor system has a single-pulse antenna which is formed by an antenna group which has a multiplicity of single antennas, for example patch antennas. A plurality of receive signals are formed from a transmitted measurement pulse of the radar sensor system, and the receive signals enable a position determination of an object, for example an angle determination, within the detection area defined by the antenna diagram.

In the case of a 2D radar sensor, the antenna group of the single-pulse antenna is divided into a left and a right half. In the case of 3D radar sensor systems, each of the left and right antenna halves is in turn divided in each case into an upper and a lower half. This enables a three-dimensional angle determination, for example for determining an azimuth angle and an elevation angle.

A communication with a communication device, for example a radio key or a mobile device such as a cell phone or the like, can also be initiated in the first operating mode and/or in the second operating mode additionally or alternatively to the evaluation of direction information or location information in order to distinguish a movement of an object which indicates an approach of a user from other, random movements in the detection area through additional authentication of a user.

A sensitivity which is set on the radar sensor system can be permanently configured or can be dynamically adapted in operation. One or more thresholds, for example, for example the speed threshold and/or the signal strength threshold, can be adapted for the sensitivity adaptation so that the sensitivity is variably adaptable for detecting the approach of an object in the first operating mode.

Different information elements, for example, can be used to adapt the sensitivity.

The radar system can thus be configured to use movement information obtained by the radar sensor system itself relating to a movement in the area of the vehicle door in order to set a sensitivity of the system. It is possible to ascertain, for example, from movement information of this type whether there is generally much movement in the area of the vehicle door, for example because a multiplicity of objects are moving in the area of the vehicle door. A background movement of this type can be caused, for example, by children playing in the area of the vehicle door, by vegetation, for example trees or bushes or the like, and is generally not intended to be detected by the radar sensor system, so that a deliberate approach to the vehicle door by a user in order to open or close the vehicle door can be distinguished from a movement in the area of the vehicle door which is not associated with a movement of the vehicle door through adaptation of the sensitivity on the basis of the movement information.

Additionally or alternatively, the radar sensor system can be configured to adapt the sensitivity on the basis of information obtained by a further sensor device. A further sensor device of this type can, for example, be a rain sensor which indicates whether rain occurs in the area of the vehicle, particularly in the area of the vehicle door also. Rain can be detected by the radar system as a movement in the area of the vehicle door, but is not intended to result in a switch to the second operating mode. The sensitivity can be adapted, for example reduced, accordingly in the first operating mode, for example when it is raining.

Then again, additionally or alternatively, the radar sensor system can be configured to set the sensitivity for a movement detection in the first operating mode on the basis of information obtained from a further vehicle system.

The further vehicle system can, for example, be a higher-level control system of the vehicle which transmits information to the radar sensor system indicating, for example, whether and when the vehicle has been put into operation. If the vehicle has not been put into operation over a lengthy period, the sensitivity can be reduced, for example, in the first operating mode in order to reduce the probability of a switch from the first operating mode to the second operating mode and therefore reduce the power consumption. If the radar sensor system is informed via the control system of the vehicle is in operation (for example if the engine is running, but the vehicle is stationary), the sensitivity can be increased, for example, in the first operating mode in order to increase the probability of a switch to the second operating mode to enable a gesture detection.

If the vehicle has been put into operation by starting the engine, but is stationary, it is also always possible, for example, to switch to the second operating mode.

Information, for example, relating to habits of a driver, for example normal operating times, can further be communicated via the higher-level control system to the radar sensor system so that the sensitivity can be adapted in the first operating mode depending on habits of this type. If, for example, information is known and stored in a higher-level control system indicating that the user normally moves the vehicle door in a specific time window, for example mornings or evenings, in order to open or close the vehicle door, the radar sensor system can adapt the sensitivity in the first operating mode on the basis of this information in such a way that the sensitivity is, for example, increased in the specific time windows in order to increase the probability of a switch to the second operating mode.

Information, for example relating to the position of the vehicle, for example an angle of pitch and/or roll, or an ambient condition, for example the temperature, can further be made available to the radar sensor system via the higher-level control system in order to derive information therefrom relating to the environment of the vehicle, on the basis of which the sensitivity can be adapted.

Then again, additionally or alternatively, the radar sensor system can be configured to set a sensitivity for a movement detection in the first operating mode on the basis of geolocation information. Geolocation information contains details indicating where the vehicle is currently located, for example where the vehicle has just parked. Sensitivity can be adapted in the first operating mode on the basis of the parking position of the vehicle and information derived therefrom relating to objects in the vicinity of the vehicle if it is known, for example, on the basis of the geolocation information that movable objects are present in the area of the vehicle door.

Then again, additionally or alternatively, the radar sensor system can be configured to set a sensitivity for a movement detection in the first operating mode on the basis of time information. The sensitivity can thus be adapted, for example, on the basis of information relating to the time of day. The sensitivity can be set, for example, to a different value during the daytime than at night.

The adaptation of the sensitivity can comprise, for example, an adaptation of the threshold values. However, a measurement frequency, for example, i.e. the number of measurements per time unit, can also be adapted in the first operating mode in order to adapt the sensitivity.

In one embodiment, the radar sensor system is designed to perform a pattern recognition of a movement in the first operating mode in order to distinguish a movement which does not indicate an approach of a user to the vehicle door from a movement which does indicate an approach of a user to the vehicle door. Objects, for example, can thus move recurrently in the area of the vehicle door, for example tree branches or the like. A movement of this type can, for example, follow a specific pattern and is characterized, for example, by an alternating forward and backward movement which can be detected accordingly by the radar sensor system. If the radar sensor system recurrently picks up, for example, a specific movement pattern caused, for example, by a forward and backward movement of an object, the radar sensor system can exclude a movement of this type and not take it into account for a switch to the second operating mode. Movement patterns which do not indicate a user and an approach to the vehicle door are thus distinguished from a movement of a user who approaches the vehicle door.

A user can, for example, normally perform a specific movement to approach the vehicle door and can approach the vehicle door, for example, from a specific direction at a specific speed. Information relating to a movement pattern of this type can be stored so that a movement recorded in the first operating mode can be compared with a predetermined pattern in order to identify an approach of a user to the vehicle door on the basis of a pattern comparison of this type.

In one embodiment, the radar sensor system is designed to switch from the second operating mode to the first operating mode after a predetermined time. If no gesture is detected within a predetermined time period in the second operating mode, this indicates that an approach of a user to the vehicle door has been erroneously detected in the first operating mode and a switch to the second operating mode has erroneously occurred. A switch back to the first operating mode occurs accordingly at the end of the predetermined time period.

If a switch to the second operating mode has been performed erroneously, i.e. without a gesture detection taking place in the second operating mode in response to a movement detection in the first operating mode, the sensitivity can then be adapted and, for example, reduced in the first operating mode in order to reduce the probability of a switch to the second operating mode and avoid an excessively frequent switching to the second operating mode. The sensitivity is therefore adapted in the first operating mode depending on whether a gesture is also actually detected in the second operating mode in response to a movement detection in the first operating mode in order to switch, if necessary, less frequently to the second operating mode if an erroneous switch to the second operating mode occurs too frequently.

The radar sensor system can have a third operating mode which corresponds to an idle mode. The radar sensor system is, for example, deactivated in the idle mode so that no gesture detection and also no movement detection are performed and the radar sensor system therefore consumes no (or only very little) energy. The radar sensor system can be switched to the idle mode, for example, if the vehicle is stationary over a lengthy time period. The radar sensor system can be woken up from the idle mode, for example, via a wake-up signal which is fed to the radar sensor system via a bus system, for example a LIN bus.

The radar sensor system can be switched to the third operating mode, for example, if the vehicle is travelling. If the vehicle stops, the radar sensor system can be switched automatically to the first operating mode by a bus signal via the bus system of the vehicle.

The system can furthermore also be combinable with a communication device, for example a radio key or a mobile device such as a cell phone or the like.

The radar sensor system can thus be switched, for example, directly to the second operating mode if a communication device is detected by a vehicle communication system. The radar sensor system can thus be switched to the second operating mode depending on the detection of a communication device, for example a radio key, in order to enable a gesture detection independently from a detection of an approach of a user in the first operating mode.

Alternatively, if a communication device is detected by a vehicle communication system, the first operating mode can be retained, but a sensitivity can be adapted in the first operating mode, for example by increasing a measurement frequency. If a communication device, for example a radio key, is detected, the probability of the radar sensor system switching from the first operating mode to the second operating mode will thus be increased.

Additionally or alternatively, if a movement is detected in the first operating mode, a switch to a key detection mode can be performed in which a vehicle communication system of the vehicle waits for a communication with a communication device, for example a radio key. If a communication device is detected in the receive range of the vehicle communication system and a user is thus authenticated, the radar sensor system can be switched to the second operating mode.

Alternatively, if a movement is detected in the first operating mode, a switch to a key detection mode can be performed in which a vehicle communication system of the vehicle waits for a communication with a communication device, for example a radio key. The radar sensor system can be switched simultaneously to the second operating mode. If no communication device is detected in the receive range of the vehicle communication system within a predetermined time period and therefore no user is authenticated, a switch back to the first operating mode of the radar sensor system can be performed. In this case, even if a gesture has been detected, the vehicle door is opened in the second operating mode only following authentication through detection of a radio key.

The radar sensor system can also be used for other vehicle functions, for example for a distance measurement system which is used in conjunction with a parking assistant, or for collision protection when the vehicle door is opened.

The information relating to the environment of the vehicle obtained by the radar sensor system can also be forwarded to a higher-level control system of the vehicle so that the higher-level control system obtains information relating to a movement in the area of the vehicle door and relating to the presence of objects in the area of the vehicle door.

The object is also achieved by a method for contactless movement of a vehicle door relative to a vehicle body comprising: detecting a gesture to be performed by a user in the area of the vehicle door by a radar sensor system and controlling a movement device for moving the vehicle door by a control device depending on a detection by the radar sensor system. It is provided that the radar sensor system detects a movement into a detection area in a surrounding area of the vehicle door in a first operating mode and detects a gesture for moving the vehicle door in a second operating mode, and the radar sensor system switches to the second operating mode if it detects a movement in the first operating mode.

The advantages and advantageous designs previously described for the system are also applicable to the method, so that the above explanations should be referred to.

BRIEF DESCRIPTION OF THE DRAWINGS

The concept on which the invention is based will be explained below by the example embodiments shown in the figures. In the figures.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

An exemplary radar sensor system is provided in EP 3 141 433 B 1 and DE 10 2007 041 288 A1.

A radar sensor system which, for gesture detection, can perform a high-resolution measurement for the spatial localization and movement of objects and in this way enables the gesture detection normally has a comparatively high power and correspondingly a substantial energy requirement. A radar sensor system of this type is therefore normally activated only if a gesture detection is intended to be performed, but is in a deactivated state if no movement action is to be performed at the vehicle door.

The radar sensor system is activated, for example, in DE 10 2007 041 288 A1 depending on a detection of a radio key which a user carries with him and which can be detected by a vehicle system. If a radio key is detected in the surrounding area of the vehicle, the radar sensor system can be switched to its active state in order to perform a gesture detection in the area of the vehicle door.

Conversely, in EP 3 141 433 B1, it is detected whether a mobile device of a user is located in a communication area of a motor vehicle in order to activate a radar sensor depending on a detection of this type.

Figure 1:
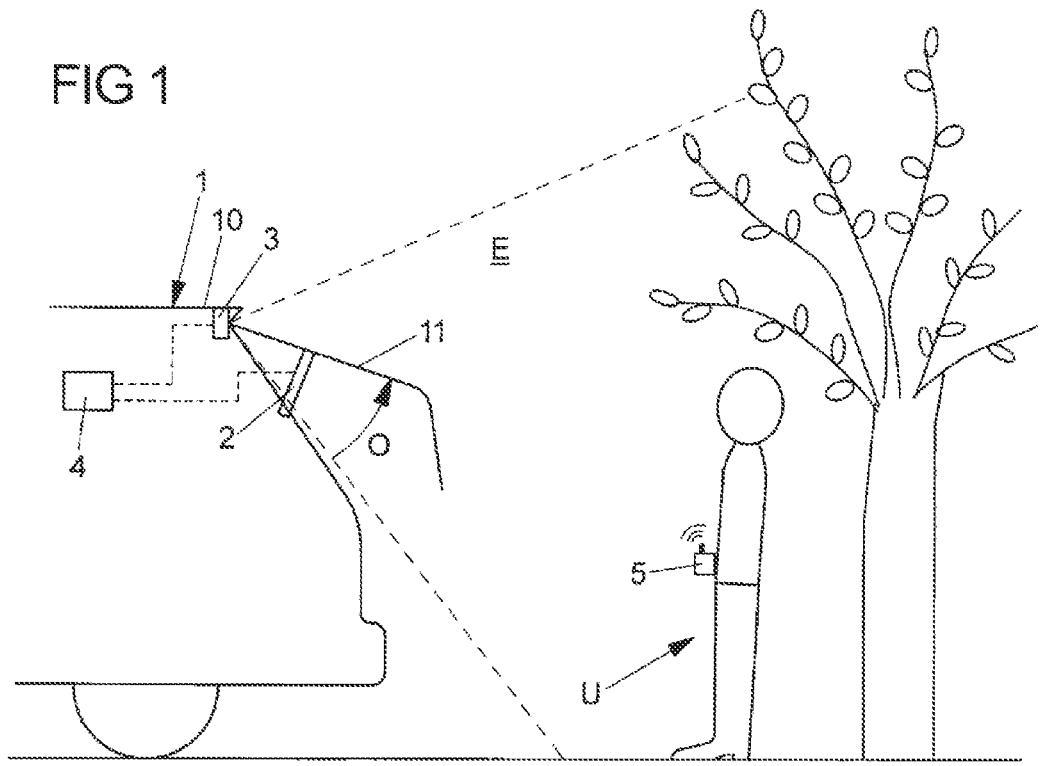
FIG. 1 shows a schematic view of a vehicle with a vehicle door arranged on a vehicle body.

FIG. 1 shows a schematic view of a vehicle on which has a vehicle door 11 arranged pivotably in relation to a vehicle body 10 in the form of a tailgate arranged at the rear of the vehicle 1.

In the system shown in FIG. 1, the vehicle door 11 can be moved via an electromotive movement device 2, for example in the form of a spindle drive or the like, relative to the vehicle body 10 in order to move the vehicle door 11 along an opening direction O from a closed position into an opened position or, conversely, to close it in the opposite direction to the opening direction O from an opened position.

A control device 4 serves to control the movement device 2.

Figure 2:
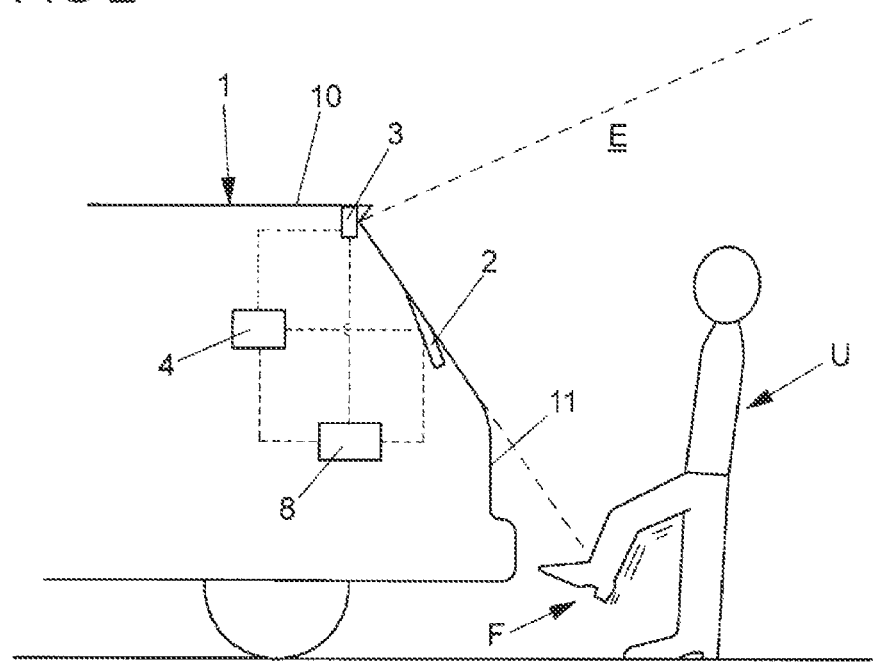
FIG. 2 shows a schematic view of a vehicle, showing a user who performs a gesture to open a vehicle door.

Signals can be picked up via a radar sensor system 3 in order to detect an approach of a user U in a detection area E at the vehicle door 11 and, if the user performs a predetermined gesture, for example a kicking gesture with his foot (see FIG. 2) in the area of the vehicle door 11, to initiate a movement of the vehicle door 11, for example an opening of the vehicle door 11, whereby the control device 4 is controlled to control the movement device 2.

Figure 4:
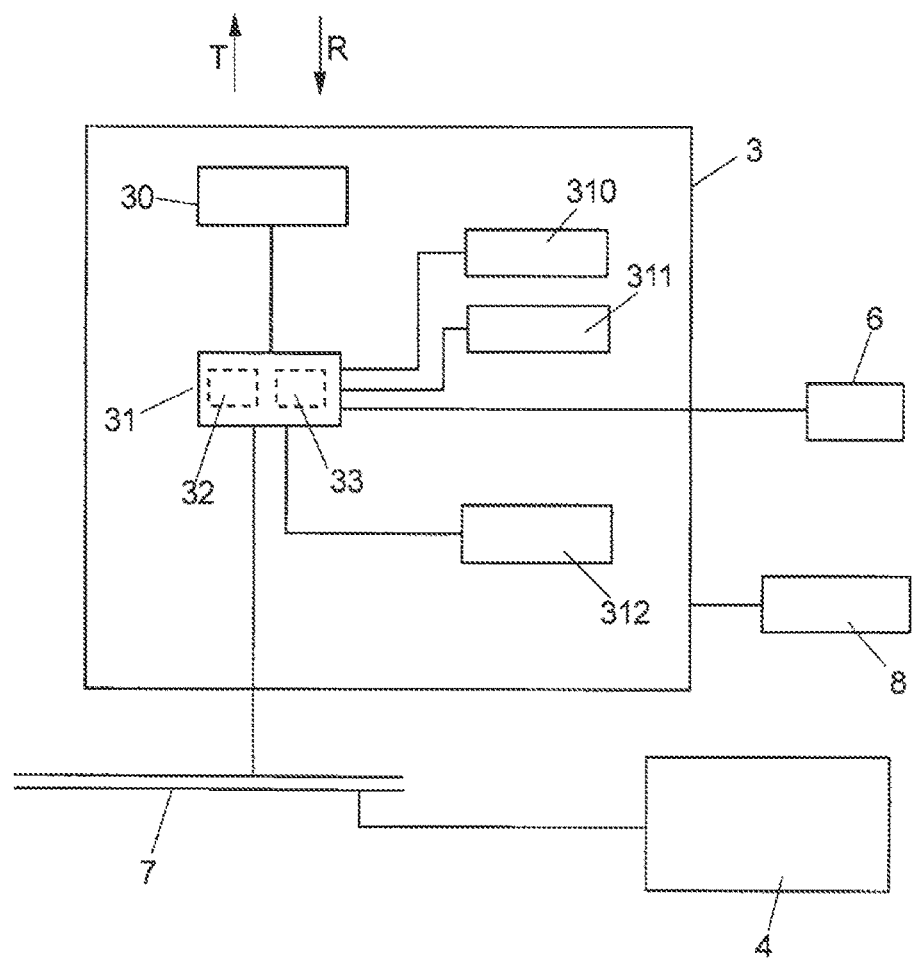
FIG. 4 shows a schematic view of an example embodiment of a radar sensor system.

The radar sensor system 3 which is shown in an example embodiment in FIG. 4 has different operating modes here which can enable, for example, a keyless access to the vehicle door 11 and a contactless movement of the vehicle door 11 without, for example, a radio key.

The radar sensor system 3 according to FIG. 4 is connected to an energy supply 8 of the vehicle 1, for example a vehicle battery, and has a transceiver device 30 and a control and evaluation unit 31.

The transceiver device 30 can have, for example, an antenna, for example in the form of a patch antenna with a predetermined directional pattern for transmitting and receiving signals T, R in the detection area E, and also electrical circuits for signal amplification and signal filtering for transmitting and receiving signals T, R. As an example, transmit signals T can be transmitted in a predetermined frequency range and receive signals R can be received via the transceiver device 30.

The radar sensor system 3 can operate, for example, in a frequency range around 24 GHz or between 78 and 81 GHz, and can transmit and receive signals T in different channels and can process assigned receive signals R.

The control and evaluation unit 31 serves, for example, to modulate transmit signals T and evaluate received signals R in order to derive information from the receive signals R relating to a movement and localization of an object in the detection area E.

The control and evaluation unit 31 is designed here to operate the radar sensor system 3 in a first operating mode 32 in which an energy consumption of the radar sensor system 3 is reduced. An approach of the user U to the vehicle 11 is intended to be detected in the first operating mode 32, and the radar sensor system 3 is operated, for example, as a continuous-wave (CW) radar, in the first operating mode 32 for this purpose and a transmit signal T is transmitted at a predetermined transmit frequency in the form of a continuous, unmodulated signal.

Figure 3:
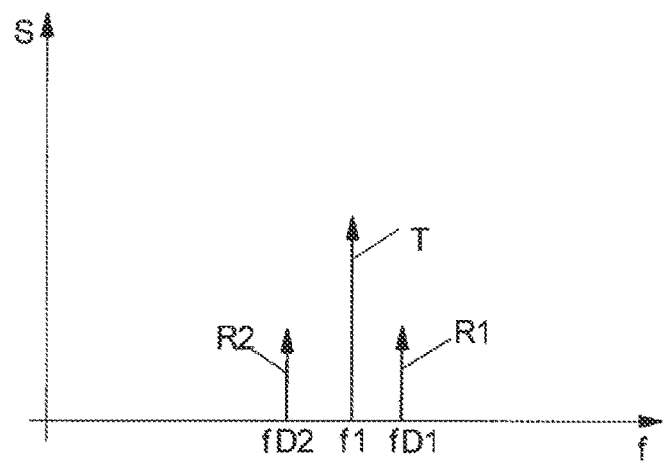
FIG. 3 shows a graphical view of a transmit signal and of reflection signals of a radar sensor system.

In the first operating mode 32, a movement of an object can be measured, for example, via a Doppler frequency. As shown in FIG. 3, a transmit signal T can thus be transmitted at a predetermined frequency f1, for example at 79 GHz. A Doppler shift occurs in a receive signal R1, R2 due to a reflection of the transmit signal T on a moving object, as a result of which the receive signal R1, R2 has a frequency spacing from the transmit signal T. An object moving away in a radial direction causes, for example, a frequency shift in the receive signal R2 toward a reduced frequency fD2. Conversely, an approaching object causes a frequency shift in the receive signal R1 toward an increased frequency fD1. A speed (in a radial direction in relation to the radar sensor system 3) can be determined from the extent of the frequency shift so that the speed of an object relative to the radar sensor system 3 can be measured via Doppler frequency measurement.

If an approach of a user U to the vehicle door 11 is detected in the first operating mode 32, the radar sensor system 3 switches to a second operating mode 33 in which a gesture detection is performed.

The energy consumption is reduced in the first operating mode 32. This can be achieved, for example, in that measurements are carried out in the first operating mode 32 with a reduced frequency, and furthermore a special resolution is limited and a mode of operation is simplified in that the radar sensor system 3 operates, for example, as a continuous-wave radar and, for example, only speed information is measured.

Conversely, a measurement with a temporally and spatially higher resolution is performed in the second operating mode 33, so that a gesture which is performed, for example, by a user U through movement of a foot F within a predefined spatial area can be detected with sufficient accuracy in order to effect a movement of the vehicle door 11 on the basis of a gesture detection of this type. The energy requirement is increased in the second operating mode 33, since, for example, the measurement frequency is increased and furthermore the frequency range can be increased and furthermore a more complex signal processing takes place.

A sensitivity of the radar sensor system 3 in the first operating mode 32 can be permanently set. It can be inferred, for example, that a user U approaches the vehicle door 11 if a measured speed exceeds a predetermined speed threshold value and/or a measured signal strength of a receive signal R1, R2 exceeds a predetermined signal strength threshold value. Direction information can be taken into account here. A positive Doppler frequency (corresponding to a frequency shift toward a higher frequency fD1) indicates an approach of an object.

In one embodiment, the sensitivity in the first operating mode 32 can be adapted dynamically in operation. The sensitivity can be adapted, for example, depending on the time of day, depending on a geolocation of the vehicle, depending on sensor data from a further sensor 6, for example a rain sensor, depending on a vehicle state or depending on further information.

A sensitivity can be set higher, for example, during the day than at night.

Additionally or alternatively, objects which are possibly located close to the vehicle can be taken into account on the basis of geolocation information in order to adapt the sensitivity.

Then again, additionally or alternatively, information from a further sensor 6, for example a rain sensor, can be taken into account in order to reduce the sensitivity of the radar sensor system 3 in the event of rain (which results in signals received by the radar sensor system 3).

Then again, additionally or alternatively, it can be taken into account for the sensitivity setting, for example, whether the engine of the vehicle is switched on or not, in which position the vehicle is currently located or which habits of a user U are known to a higher-level control system, for example the control device 4 in order to set the sensitivity on the basis of habits, for example of a time-based usage.

The threshold values, for example, the speed threshold value and the signal strength threshold value, can be adapted in order to set the sensitivity. A measurement frequency, i.e. the number of measurements per time unit, can further be adapted.

For setting the sensitivity, the radar sensor system 3 can have, for example, a position information evaluation 311 by which geolocation data are evaluated and a configuration module 312 in conjunction with which the threshold values are adapted.

The radar sensor system 3 can further perform a pattern recognition by a pattern recognition module 310 in the first operating mode 32. Patterns, for example, which do not indicate the approach of a user U can be identified using a pattern recognition of this type. A movement pattern, for example, which indicates a moving branch of a tree can be identified, for example on the basis of a recurring movement which comprises a forward movement and a backward movement and furthermore has a comparatively low receive signal strength. A pattern of this type can be excluded, for example, and not taken into account in a movement detection for determining the approach of a user U.

It is furthermore possible to perform a pattern recognition of a pattern which indicates the approach of a user U. An approach can therefore normally be linked to a constant movement toward the vehicle door 11 which occurs with a comparatively high signal strength. A movement of this type can be detected and identified as an approach of a user U through comparison with a reference pattern.

If an approach of a user U is detected in the first operating mode 32, the radar sensor system 3 switches to the second operating mode 33. A gesture detection takes place in the second operating mode 33 in which, if a gesture is detected which is assigned to a movement command for moving the vehicle door 11, a movement of the vehicle door 11 is initiated through control of the movement device 2.

However, if no gesture which corresponds to a predetermined, defined gesture is detected within a predetermined time period in the second operating mode 33, the radar sensor system 3 switches back to the first operating mode, and, for example, a sensitivity can then be reduced in the first operating mode 32 in order to reduce the probability of a switch to the second operating mode 33 and thus, as far as possible, avoid an erroneous switching to the second operating mode 33.

The radar sensor system 3 can have a third operating mode which corresponds to an idle mode. The radar sensor system 3 is deactivated in the third operating mode so that no movement detection or gesture detection takes place. The radar sensor system 3 can be switched to the idle mode, for example, via a signal which is received via a bus system 7 of the vehicle, and a wake-up signal of a radar system 3 can also be transmitted via the bus system 7 in order to wake up the radar system 3 from the idle mode and switch it to the first operating mode 32.

The radar sensor system 3 is switched to the idle mode, for example, if the vehicle is travelling. It is further possible to switch to the idle mode if the vehicle has been inoperative for a lengthy time period, for example for several days.

The system can also be combined with a detection of an additional communication device 5 of the user (see FIG. 1). The communication device 5 of this type can be configured, for example, as a radio key or by a mobile device, for example a cell phone. If a communication device 5 is detected by a detection system of the vehicle 1, the radar sensor system 3 can switch, for example, directly to the second operating mode 33, or alternatively the radar system 3 can switch to the first operating mode 32, for example with increased sensitivity.

The concept underlying the invention is not restricted to the example embodiments described above, but can also be implemented in a different manner.

The vehicle door can be a tailgate, a vehicle side door, an engine hood, a cover of a storage area (for example in the case of a pick-up truck) or the like. A vehicle door of this type can be arranged pivotably, but, if necessary, also movably, on a vehicle body.

Since the radar sensor system has different operating modes, an energy consumption of the radar sensor system can also be reduced during operation over a lengthy time period. The first operating mode can thus have a reduced energy consumption and therefore also not impose an excessive load on an energy supply of the vehicle over a lengthy time period. The first operating mode is used to detect an approach of a user in order to switch, depending on a detection of this type, to the second operating mode in which a gesture detection can be performed.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS

Reference Number List

1 Vehicle
10 Vehicle body
11 Vehicle door (tailgate)
2 Movement device
3 Radar sensor system
30 Transceiver device
31 Control and evaluation unit
310 Pattern recognition module
311 Position information evaluation
312 Configuration module
32 Movement detection mode
33 Gesture detection mode
4 Control device
5 Communication device
6 Sensor device
7 Bus system
8 Power supply
E Detection area
F Foot
f Frequency
f1 Transmit frequency,
fD1, fD2 Doppler frequency
R, R1, R2 Receive signal
T Transmit signal
U User

The invention claimed is:

1. A system configured to provide contactless movement of a vehicle door relative to a vehicle body, the system comprising:
　an electromotive movement device configured to move the vehicle door;
　a radar sensor system configured to operate in a first operating mode, in which the radar sensor system is configured to detect a movement of an object disposed within a detection area, and a second operating mode, in which the radar sensor system is configured to detect a gesture performed by a user disposed in the detection area, wherein the detection area surrounds the vehicle door; and
　a control device configured to control the electromotive movement device in response to the radar sensor system detecting the movement or the gesture, and wherein the radar sensor system is configured to change from the first operating mode to the second operating mode in response to the radar sensor system detecting the movement, wherein in the first operating mode and/or in the second operating mode, the radar sensor system is configured to evaluate a direction of the movement of the object; and
　wherein in the first operating mode, the radar sensor system is configured to set a sensitivity for movement detection based on at least one of:
　information received by a sensor device,
　information received from a vehicle system,
　geolocation information, and
　time information.

2. The system of claim 1, wherein the radar sensor system is configured to consume less energy when operating in the first operating mode than when the radar sensor system operates in the second operating mode.

3. The system of claim 1, wherein in the first operating mode, the radar sensor system is configured to measure a speed of an object in the detection area.

4. The system of claim 3, wherein the radar sensor system is configured to evaluate a Doppler frequency to measure the speed of the object.

5. The system of claim 1, wherein the radar sensor system, in the first operating mode, is configured to transmit a first transmit signal having a first frequency bandwidth, and in the second operating mode, the radar sensor system is configured to transmit a second transmit signal having a second frequency bandwidth, wherein the first frequency bandwidth is less than the second frequency bandwidth.

6. The system of claim 1, wherein in the first operating mode, the radar sensor system is configured to operate as a continuous-wave radar configured to emit a continuous transmit signal at a predetermined transmit frequency.

7. The system of claim 1, wherein in the first operating mode, the radar sensor system is configured to perform a first number of measurements per a time unit, and in the second operating mode, the radar sensor system is configured to perform a second number of measurements per the time unit, wherein the first number of measurements is less than the second number of measurements.

8. The system of claim 1, wherein in the first operating mode, the radar sensor system is configured to perform at a first spatial resolution and in the second operating mode, the radar sensor system is configured to perform at a second spatial resolution, wherein the second spatial resolution is greater than the first spatial resolution.

9. The system of claim 1, wherein, in the first operating mode, the radar sensor system is configured to detect an approaching user based on the movement in response to a speed of the object being above a speed threshold and/or a signal strength of a signal, reflected from the object, being above a signal strength threshold.

10. The system of claim 9, wherein, in the first operating mode, the radar sensor system is configured to detect the approaching user only in response to the speed of the object being above the speed threshold and being below an upper speed limit, and/or the signal strength of the signal, reflected from the object, being above the signal strength threshold and being below an upper signal strength limit.

11. The system of claim 9, wherein in the first operating mode, the radar sensor system is configured to perform a pattern recognition of a number of movements including the movement to distinguish the approaching user from a second number of movements that are not indicative of the approaching user.

12. The system of claim 1, wherein in the first operating mode, the radar sensor system is configured to set the sensitivity for movement detection based on at least one of:
　movement information received by the radar sensor system, and
　the movement or another movement disposed within a vicinity of the vehicle door.

13. The system of claim 1, wherein the radar sensor system is configured to switch from the second operating mode to the first operating mode after a predetermined time.

14. The system of claim 1, wherein the radar sensor system is configured to operate in an idle mode, in which the radar sensor system is deactivated.

15. The system of claim 14, wherein the radar sensor system is configured to switch from the idle mode to the first operating mode in response to receiving a wake-up signal from a bus system.

16. A method of providing contactless movement of a vehicle door relative to a vehicle body, the method comprising:

setting, by a radar sensor system operating in a first operating mode, a sensitivity for movement detection based on at least one of: information received by a sensor device, information received from a vehicle system, geolocation information, and time information;

detecting, by the radar sensor system operating in the first operating mode, movement within a vicinity of the vehicle door;

switching the radar sensor system from the first operating mode to a second operating mode, in response to detecting the movement within the vicinity of the vehicle door and evaluating a direction of the movement before or after switching the radar sensor system from the first operating mode to the second operating mode;

detecting, by the radar sensor system operating in the second operating mode, a gesture performed by a user disposed in a detection area, wherein the detection area is disposed in the vicinity of the vehicle door; and controlling, by a control device, a movement device to move the vehicle door in response to detecting the gesture.

17. The method of claim 16, wherein the movement detected by the radar sensor system operating in the first operating mode is indicative of the user approaching the vehicle door.

18. The method of claim 16, wherein detecting, by the radar sensor system operating in the first operating mode, movement within the vicinity of the vehicle door includes the radar sensor system detecting with a first spatial resolution and detecting, by the radar sensor system operating in the second operating mode, the gesture performed by the user disposed in a detection area, wherein the detection area is disposed in the vicinity of the vehicle door includes the radar sensor system detecting with a second spatial resolution, wherein the second spatial resolution is greater than the first spatial resolution.

19. The method of claim 16, wherein detecting, by the radar sensor system operating in the first operating mode, movement within the vicinity of the vehicle door includes the radar sensor system using a first measurement frequency, and detecting, by the radar sensor system operating in the second operating mode, the gesture performed by the user disposed in the detection area, wherein the detection area is disposed in the vicinity of the vehicle door includes the radar sensor system using a second measurement frequency, wherein the second measurement frequency is greater than the first measurement frequency.

20. A system configured to provide contactless movement of a vehicle door relative to a vehicle body, the system comprising:

an electromotive movement device configured to move the vehicle door;

a radar sensor system configured to operate in a first operating mode, in which the radar sensor system is configured to detect a movement of an object disposed within a detection area, and a second operating mode, in which the radar sensor system is configured to detect a gesture performed by a user disposed in the detection area, wherein the detection area surrounds the vehicle door; and a control device configured to control the electromotive movement device in response to the radar sensor system detecting the movement or the gesture, and wherein the radar sensor system is configured to change from the first operating mode to the second operating mode in response to the radar sensor system detecting the movement and wherein the radar sensor system is configured to determine a speed of the object in a radial direction in relation to the radar sensor system from a frequency spacing of a receive signal from a transmit signal, which is transmitted by the radar sensor system at a predetermined transmit frequency and reflected from the moving object, wherein an object moving away in a radial direction causes a frequency shift in the receive signal toward a reduced frequency and an approaching object causes a frequency shift in the receive signal toward an increased frequency compared to the transmit signal.

21. A method of providing contactless movement of a vehicle door relative to a vehicle body, the method comprising:

transmitting, by a radar sensor system operating in a first operating mode, a transmit signal at a predetermined transmit frequency;

receiving, by the radar sensor system, a receive signal which is a result of a reflection of the transmit signal from a moving object;

detecting, by the radar sensor system, that the object approaches the vehicle door if a frequency shift of the receive signal is toward an increased frequency compared to the transmit signal;

switching the radar sensor system from the first operating mode to a second operating mode, in response to detecting that the object approaches the vehicle door;

detecting, by the radar sensor system operating in the second operating mode, a gesture performed by a user disposed in a detection area, wherein the detection area is disposed in a vicinity of the vehicle door; and controlling, by a control device, a movement device to move the vehicle door in response to detecting the gesture.

* * * * *